Patented July 18, 1939

2,166,917

UNITED STATES PATENT OFFICE 2,166,917

PROCESS OF PRODUCING ALKOXYL DE-
RIVATIVES OF NITRO-AROMATIC COM-
POUNDS

Harry McCormack and Gervase J. Stockmann,
Chicago, Ill., assignors to North Shore Coke &
Chemical Company, Chicago, Ill., a corporation
of Delaware No Drawing. Application October 30, 1937,
Serial No. 172,036

14 Claims. (Cl. 260—612)

This invention relates to processes of producing alkoxyl derivatives of nitro-aromatic compounds; and it has to do more particularly with improvements in the manufacture of nitro-aryl ethers belonging to the general class of which nitrophenetoles and nitroanisoles are typical.

In preparing compounds of this type it has long been common practice to effect condensation of an alcohol, alkali metal alcoholate or similar alkoxy compound, with a halogenated nitro-aryl compound, in the presence of a caustic alkali condensing agent, such as sodium or potassium hydroxide, the reaction being conducted with the aid of moderate heating, usually in the absence of a substantial proportion of water. In order to suppress side reactions of a reducing nature tending to produce azo or azoxy compounds, it is also customary to conduct the reaction under pressure in the presence of a gaseous or other suitable oxidizing agent. Because of the strong tendency for side reactions to occur, resulting in formation of various unwanted products which not only materially lower the yield of the product sought but must also be separated therefrom by appropriate treatment involving more or less tedious and expensive manipulative operations, the need for a more efficient and economical manufacturing process has long been recognized. Accordingly, and in view of the great utility of condensation products of the type here in question for various purposes, e. g., as intermediates for dyestuffs, much effort and research have for years been expended in the attempt to find a commercially satisfactory solution of the problem. As a result, various suggestions for improvement of methods utilizing the stated condensing reaction have heretofore been made and, in some cases, have found practical application. Notwithstanding such suggestions, the methods heretofore available have left much to be desired as regards efficiency and economy of operation.

One obstacle to efficient production of a satisfactorily high yield of the desired condensation products in a satisfactorily high state of purity consists in the necessity for employing a large excess of the caustic alkali in order that the reaction may reasonably approximate completion. Rapid progress of the condensing reaction is favored by high concentration of strong alkali in free or active form, and by relatively high reacting temperatures, and hence it is essential in practice to use much more alkali than theory requires; but under these conditions the accompanying side reactions tend to cut down the yield of desired product and to contaminate it excessively with impurities. To remedy this it has been proposed to operate with a relatively substantial proportion of water in the reaction mixture (Weltz, Patent No. 1,578,943), or to hold the reaction temperature down to a relatively low maximum (Weiland & Stallman, Patent No. 2,038,620). Such expedients have the disadvantage of slowing down the reaction undesirably. Moreover, whatever may be the alkali concentration initially, it becomes progressively lower as the reaction goes on, thus slowing down the reaction and greatly delaying its completion, besides rendering it non-uniform. Another proposal (Pratt & Weltz, Patent No. 1,619,368) involves employing initially only a portion of the total required quantity of alkali; the remainder being later introduced into the reaction mixture in separate portions at successive stages of the reaction; and between each stage it is necessary to cool the mixture down and release the autoclave pressure. The time required to complete the operation is therefore at least not shortened, nor is uniformity of reaction attained. In addition, the procedure is thereby complicated materially.

It is a principal object of the invention to provide an improved process of manufacturing nitroaryl derivatives of the character described, in which the difficulties characterizing prior practice are wholly or in large measure overcome and attainment of certain new and highly desirable advantages is made possible. A more specific object is to reduce substantially the operating time within which the condensing reaction may be carried out, while at the same time obtaining the desired product in satisfactory yield and in condition of ready separability from associated side-reaction products.

With the foregoing objects and advantages in view, as well as others to be referred to hereinafter, the invention will be set forth and explained in connection with a description of certain desirable practical embodiments thereof illustrating the underlying principles involved, and will then be more particularly pointed out in the appended claims.

In accordance with the principles of the invention, the total amount of strong alkali required for effective completion of the reaction may be, and most advantageously is, present in the reaction mixture from the start of the condensing reaction; and, most desirably, a portion of it is initially present in free or active condition and in quantity somewhat in excess of that theoretically required by the condensing reaction. But at least a considerable portion of said total amount is present initially in latent or relatively inactive form, viz: as a compound, e. g., the salt of a relatively weak acid, decomposable under the conditions of operation to release the alkaline condensing agent in free or active condition as rapidly as needed. Thus, in the best embodiments of the invention, a quantity of free caustic alkali substantially less than the total amount ultimately required but in concentration sufficiently high to promote the desired condensing action effectively, without affecting the yield and purity of the desired product, is present in the initial mix; and, in particular, maintenance of substantially that initial desirable free alkali concentration continuously, throughout the progress of the reaction, is ensured by the presence of the decomposable compound aforesaid from which the additional quantity of free or active alkali necessary to carry the condensing reaction to the desired degree of completion is freed progressively as the reaction proceeds. In this way, the presence of an undesirably large proportion of free alkali in the mixture at any given stage of the process is avoided, while the total required amount is nevertheless continuously available for gradual release in free condition, as and when needed, to carry the reaction to substantial completion. Besides obviating the necessity for interrupting operations to make successive additions of caustic alkali, the invention thus enables maintaining the supply or concentration of active alkali in the reaction mix substantially constant at a safe value, thus favoring uniformity and smoothness of the reaction and, for any given operating temperature, minimizing loss through decomposition and side reactions. Furthermore, the novel method affords the additional advantage that, because it enables maintaining the active alkali concentration at a highly effective point while gurding against its becoming excessive, it thereby becomes possible, where desired, to speed up the condensing reaction by operating at higher temperatures than have heretofore been feasible to employ, nevertheless obtaining good yields of satisfactorily pure desired products.

Accordingly, in whatever specific form it may be embodied, the novel process is conducive to most effective utilization of reacting materials within a minimum reaction period, all without sacrificing yield or quality of desired products and indeed, in the best embodiments of the invention, with improved yield and quality. The resultant decrease in manufacturing costs is of substantial commercial importance.

Within the broad scope of the invention, any of various more or less readily decomposable salts of alkali-forming bases may be employed as the source of available active or free alkali in the manner explained. Such salts of the alkali metals are ordinarily most advantageous, alkalimetal silicates being very effective for the purposes of the invention. In particular, the use of an alkali metal metasilicate is desirable, sodium metasilicate ($Na_2SiO_3.6H_2O$) being especially suitable and generally to be recommended for use in practice. A commercially available form represented substantially by the formula $Na_4SiO_4$ is also satisfactory for the purpose. Other commercial forms of sodium silicate (e. g., $Na_2Si_2O_5.2H_2O$) may be used but are less advantageous, partly because of the lower content of sodium oxide. The corresponding potassium silicates will also serve but are more expensive.

In order to further explain the principles of the invention, its application to the manufacture of para-nitrophenetole will be hereinafter described by way of specific example.

In employing the novel process for the manufacture of para-nitrophenetole, a mixture is prepared comprising suitable proportions of para-nitrochlorbenzene, ethyl alcohol, sodium hydroxide and sodium metasilicate, and the mixture is moderately heated to effect the desired condensing reaction. Most desirably, the operation is carried out in an autoclave under pressure and in the presence of an oxidizing agent in order to avoid excessive production of contaminating by-products through reduction. At the conclusion of the reaction, the charge is cooled and para-nitrophenetole separated from the liquid mixture by crystallization. The mother liquor may with advantage be utilized, together with the requisite additions of fresh ingredients, in making up a new charge for treatment in the manner described; this recycling of the residual liquor, or a substantial part of it, effecting marked economies, particularly in that it tends to suppress side reactions and increase the yield of para-nitrophenetole, and therefore constituting an important feature of the invention in its specific aspects.

It is of course feasible, instead of mixing all the ingredients together initially, to effect reaction separately between the alcohol and caustic soda and then to mix the resultant product with the para-nitrochlorbenzene and sodium metasilicate, and such variations in specific procedure are to be understood as falling within the scope of the invention as defined by the appended claims. But in actually practicing the process there is usually no advantage in effecting such separate preliminary reaction, especially since it involves additional manipulation and renders the procedure less simple. Ordinarily, the caustic alkali is simply added in finely divided solid form to the other ingredients and thoroughly mixed therewith.

In a typical instance, the initial mix may be made up as follows:

| | Parts by weight |
|---|---|
| Para-nitrochlorbenzene | 10 |
| Ethyl alcohol (95%) | 37 |
| Sodium hydroxide | 3.2 |
| Sodium metasilicate | 6 |

In this mix, the amount of sodium hydroxide used is about one-third more than is required by theory. The above mix having been charged into an autoclave, which may desirably be constructed of a corrosion-resistant alloy steel such as stainless steel, oxygen is then introduced from a high pressure supply cylinder into the space above the reaction mixture until the pressure over the mixture reaches, say, 150 to 200 pounds. Heat is then applied at such a rate as to enable attaining a maximum reaction temperature of, say, 150° C. in from 1½ to 2½ hours. The reacting mass is held at approximately this temperature for a sufficient time, usually about 3 hours, to ensure the condensing reaction going to the desired degree of completion; after which the autoclave is cooled rapidly to 70° C. or below. At this point, the mass in the autoclave, which is still in liquid condition, may be blown into a steam heated filter press and filtered to remove any free silica and residual undissolved excess of sodium metasilicate. The filtered liquor is then further cooled sufficiently to crystallize out para-nitrophenetole, the resultant crystals being separated from the mother liquor in any suitable manner and washed with water at about 30°–40° C. to remove adhering mother liquor.

Notwithstanding the relatively high reaction temperature employed, the overall yield of para-nitrophenetole obtained when operating as described in the specific example just given is ordinarily from 83 to 87 per cent of theoretical, or even higher, and the product is of exceptionally high purity as indicated by its melting point which closely approximates that of chemically pure para-nitrophenetole.

The residual mother liquor from the crystallization contains, in addition to a large proportion of alcohol, the remainder of the original para-nitrochlorbenzene component of the reaction mix as nitrophenol. This can be recovered as such in known manner or, and more advantageously, the mother liquor can be recycled in the process as hereinabove explained.

In the specific example above given, the alkalinity of the initial reaction mix, based on quantity of free caustic alkali present in relation to volume of mix, is equivalent to about 1.8 N, and a range of, say, 1.7 N to 2.2 N represents typical good practice under optimum conditions; but it is to be understood that these limits are not rigidly fixed, and that the benefits of the invention are realizable in substantial degree even when operating outside of the above-indicated normality range. The strength of the ethyl alcohol used is not material within the broad scope of the invention, but as a rule it is advisable to use alcohol of at least 90% strength. The proportion of alcohol to para-nitrochlorbenzene may also vary considerably.

Although the operating temperature in the illustrative example hereinabove set forth is 150° C., and although the ability to operate at this unusually high reaction temperature is an important specific feature of the invention because of the great saving in time thereby effected, it is not to be inferred that the invention is in any sense restricted to the employment of such relatively high temperatures. On the contrary, the new process affords decided practical advantages over previously known processes even when it is conducted at much lower temperatures, e. g., such as those characterizing prior practice. For instance, if a maximum reacting temperature of 120° C. is not exceeded, but the operating conditions otherwise remain as given in the above specific example, it is merely necessary to hold the reaction mass at this maximum temperature somewhat longer in order to obtain the same yield of high purity product as when a maximum reacting temperature of 150° C. is employed. The total elapsed time for effecting the condensing reaction is still much less than is required by previously known processes. Similar saving in time is effected by the present process when the reacting temperature is limited to still lower maxima than 120° C. Indeed, it may be stated generally that, for comparable percentages of product yield and purity of product, the present process effects a substantial saving in time over prior processes, whatever may be the maximum reacting temperature used; and, in the most advantageous embodiments of the present invention, this saving in time amounts to as much as 50 to 75 per cent of the time heretofore required. In prior processes, the reaction is ordinarily carried out at from 95° to 115° C. and usually requires a total of from 10 to 16 hours to complete; whereas results at least as good are obtainable by the present process in from 4 to 6 hours total elapsed time when operating at temperatures within the approximate range of 120° to 150° C.

The important effects of having at least a substantial proportion of the required total available caustic alkali content of the initial charge or reaction mix present in such form that it is inactive or latent and only later becomes free or active progressively as the condensing reaction proceeds, is further evidenced by the results of comparative tests conducted under the same conditions except as to the character of the supply of available caustic alkali employed. Thus, if the sodium metasilicate employed in the specific example hereinabove given be omitted and if the total required amount of alkali be provided at the outset in the form of free sodium hydroxide, the conditions of operation being otherwise as set forth in said example, about 50 per cent of the resultant reaction product is p-p'-dichlorazoxy-benzene, the small yield of para-nitrophenetole being so contaminated with this undesirable reduction product as to render its separation impractical commercially.

As hereinabove pointed out, the principles of the invention are similarly applicable to the manufacture of other alkoxyl derivatives of nitro-aromatic compounds, especially nitro-aryl ethers, capable of being synthesized by the same general condensing reaction employed for the preparation of para-nitrophenetole. Thus, in applying the new process to the manufacture of ortho-nitroanisole, ortho-nitrochlor-benzene and methyl alcohol are employed in place of para-nitrochlorbenzene and ethyl alcohol. By similar obvious substitution of reacting materials, other products such as para-nitroanisole, dinitroanisole, and the like, may be prepared in accordance with the principles of the invention, the appropriate nitro-aryl halide and aliphatic alcohol being employed in each instance.

It is believed to be broadly new, in preparing alkoxyl derivatives of nitro-aromatic compounds by the general method of condensing an alcohol and a nitro-aryl halide, to accomplish this with the aid of a decomposable compound of an available alkaline condensing agent that is progressively released in active condition as the reaction progresses, whether or not said alkaline condensing agent is initially present in active or free condition in the reaction mixture. But in practice best results are obtained when a major portion of the total available alkali employed is present in the initial mix as free or active alkali in amount exceeding that theoretically required by the condensing reaction. In the illustrative example hereinabove given, approximately two-thirds of the total available sodium hydroxide is introduced as such into the initial mix, the remaining one-third being bound or combined as sodium metasilicate for progressive release to maintain suitable concentration of active alkali in the mix continuously throughout the reaction. Approximately this proportioning of the two kinds of available alkaline condensing agent is found to be especially desirable in practicing the invention.

What is claimed is:

1. In the manufacture of alkoxyl derivatives of nitro-aromatic compounds, the process which comprises heating a nitro-aryl halide and an alcohol together and effecting condensation thereof with the aid of a salt of an alkali-forming base decomposable as the reaction progresses to release an alkaline condensing agent.

2. In the manufacture of alkoxyl derivatives of nitro-aromatic compounds, the process which comprises heating a nitro-aryl halide and an alcohol together and effecting condensation thereof with the aid of a silicate of an alkali metal.

3. In the manufacture of alkoxyl derivatives of nitro-aromatic compounds, the process which comprises heating a mixture containing a nitro-aryl halide, an alcohol and caustic alkali to effect reaction therebetween, said mixture also including a salt of an alkali-forming base decomposable as the reaction progresses to release a further quantity of caustic alkali.

4. In the manufacture of alkoxyl derivatives of nitro-aromatic compounds, the process which comprises heating a mixture containing a nitro-aryl halide, an alcohol, caustic alkali and a silicate of an alkali metal.

5. In the manufacture of alkoxyl derivatives of nitro-aromatic compounds, the process which comprises heating a mixture containing a nitro-aryl halide, an alcohol, sodium hydroxide and sodium silicate.

6. In the manufacture of nitro-aryl ethers, the process which comprises heating a mixture containing a nitro-benzene halide, an aliphatic alcohol, an alkali metal hydroxide and a silicate of an alkali metal.

7. In the manufacture of para-nitrophenetole, the process which comprises heating a mixture containing para-nitrochlorbenzene, ethyl alcohol, sodium hydroxide and sodium metasilicate.

8. In the manufacture of para-nitrophenetole, the process which comprises heating a mixture containing para-nitrochlorbenzene, ethyl alcohol, sodium hydroxide and sodium metasilicate, the reaction mixture being maintained at a temperature not substantially lower than 120° C. during a part of the heating period.

9. In the manufacture of para-nitrophenetole, the process which comprises heating a mixture containing para-nitrochlorbenzene, ethyl alcohol, sodium hydroxide and sodium metasilicate, the reaction mixture being maintained at a temperature not substantially lower than 150° C. during a part of the heating period.

10. In the manufacture of para-nitrophenetole, the process which comprises heating a mixture containing para-nitrochlorbenzene, ethyl alcohol, sodium hydroxide and sodium metasilicate, cooling the liquid reaction mixture, separating para-nitrophenetole therefrom by crystallization, utilizing at least a portion of the residual mother liquor in preparing a fresh reaction mixture, and repeating the aforesaid operations in cycle.

11. In the manufacture of para-nitrophenetole, the process which comprises heating a mixture containing para-nitrochlorbenzene, ethyl alcohol, sodium hydroxide and sodium metasilicate, at a sufficiently rapid rate to raise the temperature of the mixture to a maximum within the approximate range of 120° to 150° C. within a period of from about 1½ to 2½ hours, and maintaining the reaction temperature within said range until the reaction is sufficiently complete, the aforesaid heating of the mixture being effected under pressure and in the presence of an oxidizing agent, separating solid material from the resultant fluid reaction mass, and crystallizing para-nitrophenetole from the residual liquor.

12. In the manufacture of alkoxyl derivatives of nitro-aromatic compounds, the process which comprises effecting condensation of a nitro-aryl halide with an alcohol, with the aid of an available alkaline condensing agent present in quantity sufficient to ensure carrying the condensing reaction to substantial completion; the major portion of such quantity being provided in active condition at the commencement of the reaction, and the remainder being provided in latent condition as a decomposable salt of an alkali-forming base adapted to release it in active condition as the reaction progresses.

13. In the manufacture of nitro-aryl ethers, the process which comprises heating a mixture containing a nitro-aryl halide and an alcohol together with available caustic alkali initially present in amount sufficient to ensure substantially complete condensing reaction of the nitro-aryl halide with the alcohol, the major portion of said total amount being provided in active condition at the commencement of the reaction, and the remainder being provided in combination as silicate.

14. In the manufacture of para-nitrophenetole, the process which comprises heating para-nitrochlorbenzene and ethyl alcohol, in the presence of available sodium hydroxide initially present in sufficient quantity to ensure substantially complete condensing reaction of the para-nitrochlorbenzene with the alcohol, enough of said quantity being provided in active condition at the commencement of the reaction to ensure the presence of an excess over the amount theoretically required by the condensing reaction, and the remainder being provided in the form of sodium metasilicate.

HARRY McCORMACK.
GERVASE J. STOCKMANN.